United States Patent
Gough et al.

(10) Patent No.: US 11,118,491 B1
(45) Date of Patent: Sep. 14, 2021

(54) GASOLINE PARTICULATE FILTER REGENERATION SYSTEMS AND METHODS

(71) Applicant: GM GLOBAL TECHNOLOGY OPERATIONS LLC, Detroit, MI (US)

(72) Inventors: William D. Gough, Metamora, MI (US); Michael A. Smith, Clarkston, MI (US); Vijay A. Ramappan, Novi, MI (US); Timothy Wendling, New Lothrop, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/060,241

(22) Filed: Oct. 1, 2020

(51) Int. Cl.
| | |
|---|---|
| *F01N 3/02* | (2006.01) |
| *F01N 9/00* | (2006.01) |
| *F02M 26/09* | (2016.01) |
| *F02D 41/00* | (2006.01) |
| *F02D 41/02* | (2006.01) |
| *F01N 3/023* | (2006.01) |

(52) U.S. Cl.
CPC .......... *F01N 3/0233* (2013.01); *F01N 9/002* (2013.01); *F02D 41/0007* (2013.01); *F02M 26/09* (2016.02); *F02D 41/029* (2013.01)

(58) Field of Classification Search
CPC ........ F01N 3/021; F01N 3/023; F01N 3/0233; F01N 3/0236; F01N 9/002; F01N 2900/1606; F02D 41/0007; F02D 41/029; F02D 2200/0812; F02M 26/09; Y02T 10/12; Y02T 10/40
See application file for complete search history.

(56) References Cited

U.S. PATENT DOCUMENTS

| | | | | |
|---|---|---|---|---|
| 9,163,543 | B2 * | 10/2015 | Cavataio | ................. F01N 3/225 |
| 2013/0167508 | A1 * | 7/2013 | Nishimura | ................ F01N 9/00 60/274 |
| 2016/0348615 | A1 * | 12/2016 | Fischer | .................. F02M 26/22 |

\* cited by examiner

*Primary Examiner* — Audrey B. Walter
*Assistant Examiner* — Dapinder Singh
(74) *Attorney, Agent, or Firm* — Harness, Dickey & Pierce, P.L.C.

(57) ABSTRACT

A regeneration system for a vehicle includes: a particulate module configured to determine an amount of particulate trapped within a particulate filter, the particulate filter configured to filter particulate from exhaust output from an engine; and a regeneration control module configured to, in response to a determination that the amount of particulate trapped within the particulate filter is at least a predetermined amount: close a wastegate of a turbocharger; and open an EGR valve connected (a) to an intake system of the engine downstream of the turbocharger and (b) to upstream of the particulate filter, the closing of the wastegate and the opening of the EGR valve flowing air from (a) the intake system to (b) upstream of the particulate filter through the EGR valve without the air entering the engine.

20 Claims, 4 Drawing Sheets

GASOLINE PARTICULATE FILTER REGENERATION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to gasoline particulate filters and more particularly to systems and methods for regenerating gasoline particulate filters.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases.

A fuel control system adjusts the rate that fuel is injected to provide a target air/fuel mixture to the cylinders and/or to achieve a target torque output. Increasing the amount of air and fuel provided to the cylinders increases the torque output of the engine.

The engine outputs exhaust to an exhaust system. The exhaust system may include one or more components configured to reduce one or more constituents of the exhaust, such as nitrogen oxides (NOx), carbon oxides (e.g., carbon monoxide, carbon dioxide, etc.), hydrocarbons (HC), and particulate.

SUMMARY

In a feature, a regeneration system for a vehicle includes: a particulate module configured to determine an amount of particulate trapped within a particulate filter, the particulate filter configured to filter particulate from exhaust output from an engine; and a regeneration control module configured to, in response to a determination that the amount of particulate trapped within the particulate filter is at least a predetermined amount: close a wastegate of a turbocharger; and open an EGR valve connected (a) to an intake system of the engine downstream of the turbocharger and (b) to upstream of the particulate filter, the closing of the wastegate and the opening of the EGR valve flowing air from (a) the intake system to (b) upstream of the particulate filter through the EGR valve without the air entering the engine.

In further features, the regeneration control module is further configured to, in response to the determination that the amount of particulate trapped within the particulate filter is at least the predetermined amount, adjust at least one of an intake valve opening timing and an intake valve closing timing.

In further features, the regeneration control module is further configured to, in response to the determination that the amount of particulate trapped within the particulate filter is at least the predetermined amount, adjust at least one of an exhaust valve opening timing and an exhaust valve closing timing.

In further features, the regeneration control module is further configured to, in response to the determination that the amount of particulate trapped within the particulate filter is at least the predetermined amount, adjust an intake valve opening timing, an intake valve closing timing, an exhaust valve opening timing, and an exhaust valve closing timing.

In further features, the regeneration control module is configured to close the wastegate before opening the EGR valve.

In further features, the regeneration control module is further configured to: determine whether air is flowing from (a) the intake system to (b) upstream of the particulate filter through the EGR valve after the opening of the EGR valve; and in response to a determination that air is not flowing from (a) the intake system to (b) upstream of the particulate filter through the EGR valve, at least one of: open the EGR valve further; and close the wastegate further.

In further features, the regeneration control module is further configured to: determine whether air is flowing from (a) the intake system to (b) upstream of the particulate filter through the EGR valve after the opening of the EGR valve; and adjust fueling of the engine in response to a determination that air is flowing from (a) the intake system to (b) upstream of the particulate filter through the EGR valve.

In further features, the regeneration control module is configured to adjust fueling of the engine based on a stoichiometric exhaust input to a catalyst implemented upstream of the particulate filter.

In further features, the EGR valve is connected to (b) between the catalyst and the particulate filter.

In further features, the regeneration control module is configured to, based on an amount of oxygen measured in exhaust by an oxygen sensor located upstream of the particulate filter, determine whether air is flowing from (a) the intake system to (b) upstream of the particulate filter through the EGR valve.

In further features, the regeneration control module is configured to, based on a pressure across the EGR valve measured using a delta pressure sensor, determine whether air is flowing from (a) the intake system to (b) upstream of the particulate filter through the EGR valve.

In further features, a threshold module is configured to determine a threshold amount of air through the EGR valve for regeneration, where the regeneration control module is configured to end the regeneration when an amount of air through the EGR valve during the regeneration is greater than or equal to the threshold amount of air through the EGR valve.

In further features, an amount module is configured to determine the amount of air through the EGR valve during the regeneration based on a pressure across the EGR valve measured using a delta pressure sensor.

In further features, the particulate filter is a gasoline particulate filter.

In further features, the regeneration control module is configured to close the wastegate in response to a determination that a temperature of exhaust input to the particulate filter is greater than or equal to a predetermined temperature.

In further features, in response to a determination that the temperature of the exhaust input to the particulate filter is less than the predetermined temperature, retard a spark timing of the engine.

In further features, in response to a determination that the temperature of the exhaust input to the particulate filter is less than the predetermined temperature, adjust an equivalence ratio of fueling of the engine.

In further features, in response to a determination that the temperature of the exhaust input to the particulate filter is less than the predetermined temperature, increase a number of fuel injections per combustion event of the engine.

In further features, in response to a determination that the temperature of the exhaust input to the particulate filter is less than the predetermined temperature, transition to two fuel injections per combustion event of the engine.

In a feature, a method includes: determining an amount of particulate trapped within a particulate filter of a vehicle, the particulate filter configured to filter particulate from exhaust output from an engine; and in response to a determination that the amount of particulate trapped within the particulate filter is at least a predetermined amount: closing a wastegate of a turbocharger; and opening an EGR valve connected (a) to an intake system of the engine downstream of the turbocharger and (b) to upstream of the particulate filter, the closing of the wastegate and the opening of the EGR valve flowing air from (a) the intake system to (b) upstream of the particulate filter through the EGR valve without the air entering the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel to generate drive torque. Exhaust resulting from combustion of air and fuel flows through an exhaust system before being expelled to atmosphere. An exhaust recirculation valve is configured to recirculate exhaust from the exhaust system back to an intake system of the engine to be mixed with fresh air.

The exhaust system may include a particulate filter configured to trap particulate in the exhaust. The exhaust system may also include one or more other components configured to reduce one or more other exhaust constituents before the exhaust is expelled to atmosphere.

From time to time, regeneration is performed to remove particulate trapped within the particulate filter by burning the trapped particulate (e.g., including hydrocarbons). Oxygen in the exhaust may be used to burn the trapped particulate.

The present application involves increasing intake pressure and opening the EGR valve to flow fresh air to the particulate filter through the EGR valve for regeneration of the particulate filter. This provides for particulate burning conditions within the GPF while minimizing other exhaust constituents, such as nitrogen oxides.

Figure 1:
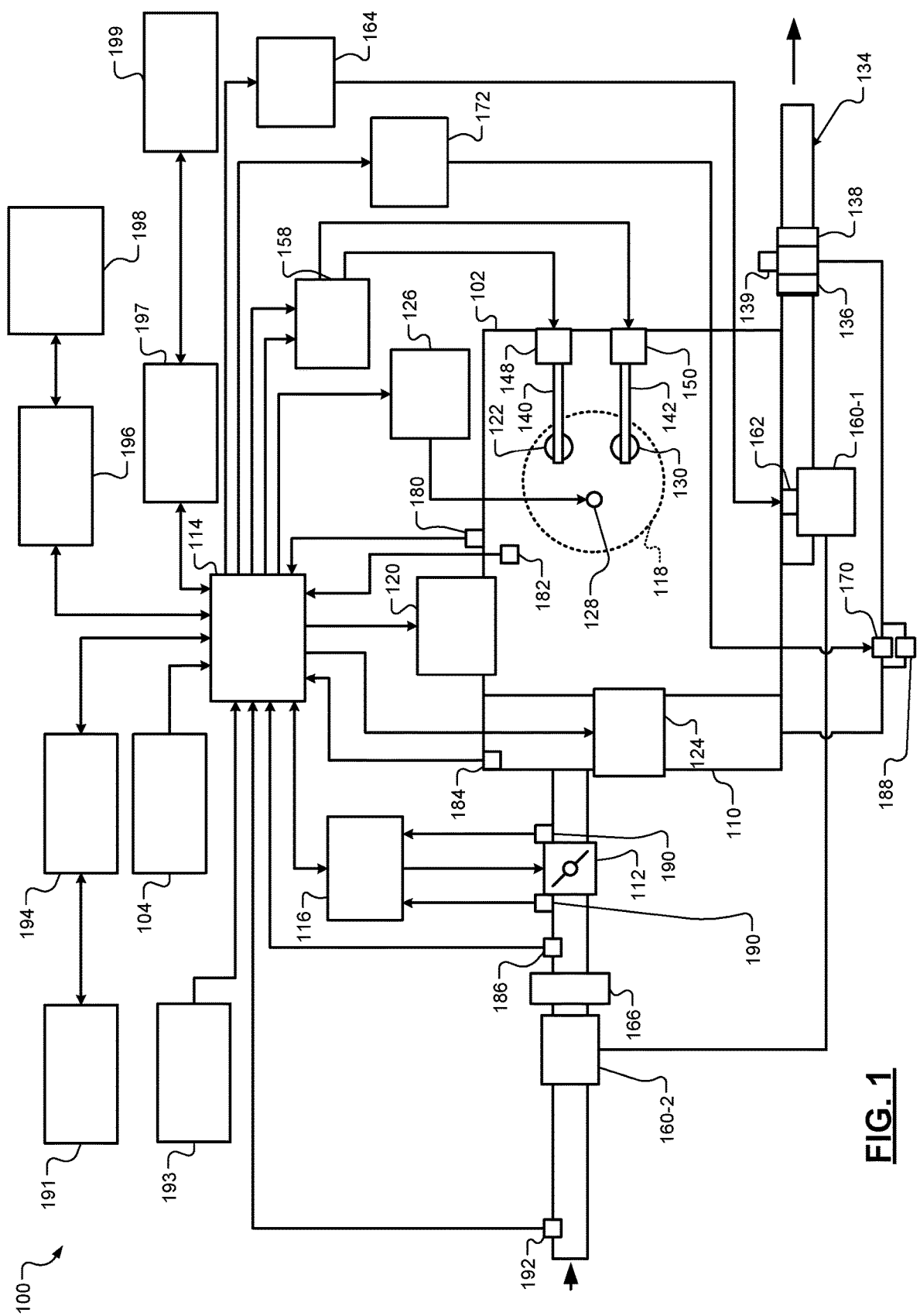
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel (e.g., gasoline or E85) injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The exhaust system 134 includes a catalyst 136 that reacts (chemically) with one or more exhaust components, such as nitrogen oxides (NOx). The catalyst 136 may include, for example, a three-way catalyst or another suitable type of catalyst. A gasoline particulate filter (GPF) 138 is implemented downstream of the catalyst 136. The GPF 138 filters particulate from the exhaust and traps filtered particulate. As shown, the catalyst 136 and the GPF 138 may be implemented within a housing. The GPF 138 may be regenerated at times to remove trapped particulate from the GPF 138 by burning the trapped particulate. Regeneration of the GPF 138 may refer to the burning of the particulate trapped within the GPF 138. An oxygen sensor 139 may measure a concentration of oxygen in the exhaust between the catalyst 136 and the GPF 138.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (e.g., high lift and low lift) may also be controlled by the phaser actuator module 158. The phaser actuator module 158 may actuate a camshaft such that one set of lobes of the camshaft opens and closes valves to initiate high lift operation and actuate the camshaft such that another set of lobes of the camshaft opens and closes valves to initiate low lift operation.

The engine system 100 may include a turbocharger that includes a hot turbine 160-1 that is powered (rotatably driven) by hot exhaust gases flowing through the exhaust system 134. The turbocharger also includes a cold air compressor 160-2 that is driven by the turbine 160-1. The compressor 160-2 compresses air leading into the throttle valve 112.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. Boost may decrease as opening of the wastegate 162 increases and vice versa. In various implementations, two or more turbochargers may be implemented and may be controlled by the boost actuator module 164.

A charge air cooler (CAC) 166 may transfer heat from the compressed air charge to a cooling medium, such as engine coolant or air. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include one or more EGR valves, such as an EGR valve 170, which selectively redirect exhaust gas back to the intake manifold 110. The EGR valve 170 may flow exhaust gas from upstream of the GPF 138 to the intake manifold 110, such as from between the catalyst 136 and the GPF 138. The EGR valve 170 is controlled by an EGR actuator module 172 based on signals from the ECM 114. Because the EGR valve 170 is connected to the exhaust system 134 upstream of the GPF 138, the EGR valve 170 can be used to flow fresh air to the GPF 138 for regeneration without the air flowing through the engine 102, as discussed further below.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112. A delta pressure sensor 188 may measure a pressure difference across the EGR valve 170.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an accelerator pedal position (APP) sensor, a brake pedal position (BPP) sensor, an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194, such as to coordinate engine torque output with shifting gears in a transmission 191 and actuation of one or more clutches. The transmission 191 transfers received torque to wheels via a driveline including a plurality of shafts, such as one or more drive shafts, half shafts, etc.

The ECM 114 may communicate with a hybrid control module 196, such as to coordinate operation of the engine 102 and an electric motor 198. The electric motor 198 may also function as a generator, and may be used to produce electrical energy for use by vehicle electrical systems and/or for storage in a battery. More than one electric motor may be implemented in various implementations.

An electronic brake control module (EBCM) 197 controls application of friction brakes 199 based on a BPP measured by the BPP sensor. For example, the EBCM 197 may control a pressure of brake fluid applied to brake calipers based on the BPP. The EBCM 197 may, for example, increase the pressure as the BPP increases away from a resting (e.g., 0) positon and vice versa.

In various implementations, various functions of the ECM 114, the transmission control module 194, the EBCM 197, and the hybrid control module 196 may be integrated into one or more modules. While the example of the hybrid control module 196, the EBCM 197, and the transmission control module 194 communicating with the ECM 114 is provided, the control modules discussed herein may communicate with one another via a communication bus.

Each engine system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve to achieve a target EGR opening area. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque (a torque request).

Figure 2:
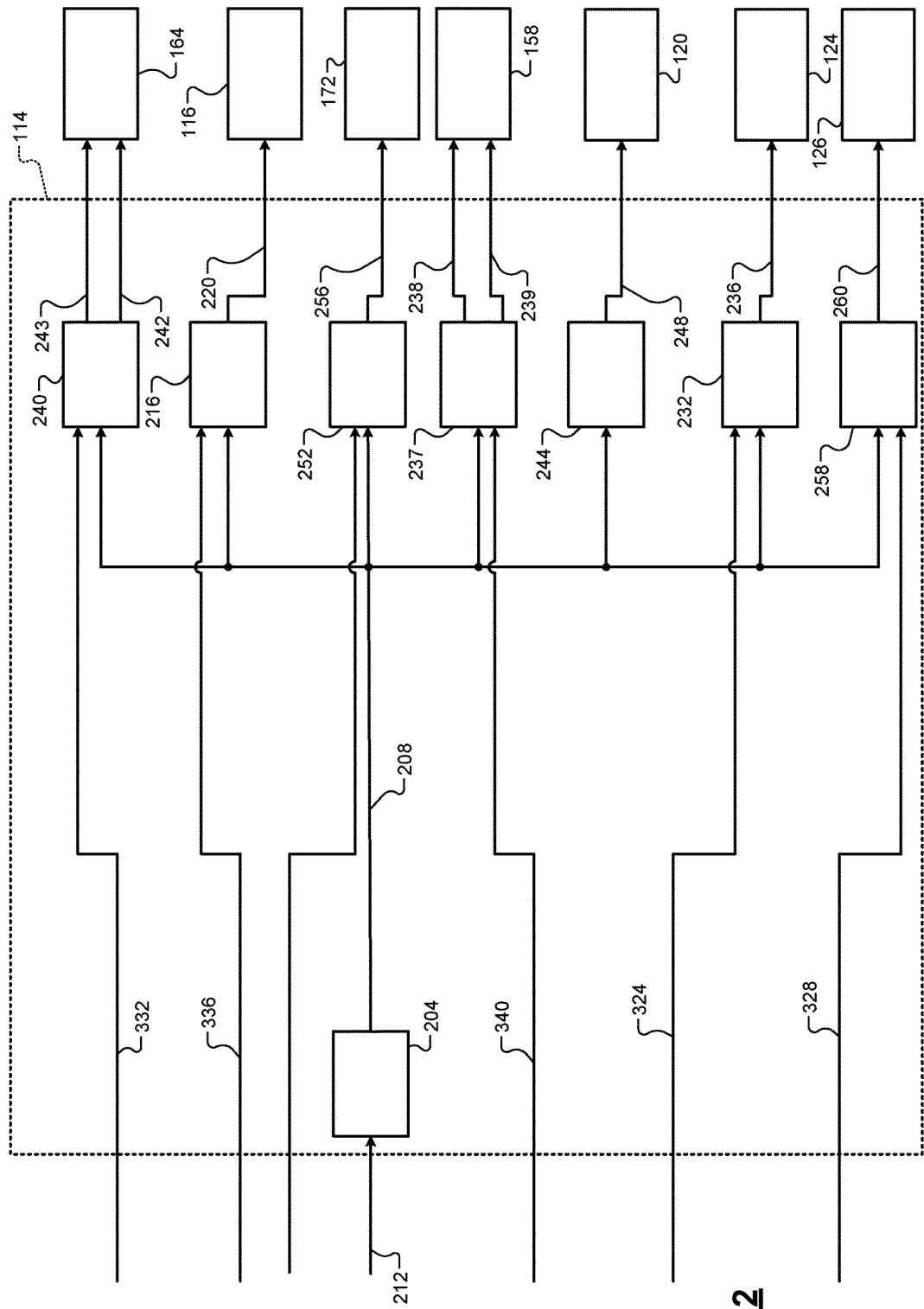
FIG. 2 is a functional block diagram of an example engine control module.

Referring now to FIG. 2, a functional block diagram of an example engine control system is presented. A torque request module 204 determines a torque request 208 for the engine 102 based on one or more inputs 212. The inputs 212 may include, for example, the accelerator pedal position (APP), the BPP, a cruise control input, and/or one or more other suitable inputs. For example, the torque request module 204 may increase the torque request 208 as the APP increases (e.g., relative to a predetermined resting (0) APP) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the EBCM 197, the hybrid control module 196, etc. The torque request module 204 may determine the torque request 208 (e.g., in Nm) using one or more equations and/or lookup tables that relate input(s) to torque requests.

The torque request module 204 may also determine the amount of torque to be produced by the engine 102 and the amount of torque to be produced via one or more electric motors. The torque request module 204 may transmit a motor torque request to the hybrid control module 196 corresponding to the amount of torque to be produced via the one or more electric motors. The hybrid control module 196 controls an inverter that controls electric power flow to and from the electric motor(s) to achieve the motor torque request.

The ECM 114 controls the engine actuators based on the torque request 208 and/or one or more other parameters. For example, a throttle control module 216 may determine a target throttle opening 220 based on the torque request 208. The throttle actuator module 116 may adjust opening of the throttle valve based on the target throttle opening 220, respectively.

A fuel control module 232 determines one or more target fueling parameters 236 based on the torque request 208. For example, the target fueling parameters 236 may include a target equivalence ratio (EQR) or mass of fuel, number of fuel injections per combustion event, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. The phaser control module 237 may also determine a target lift state (e.g., low lift or high lift operation). The phaser actuator module 158 may actuate one or more lift actuators to achieve the target lift state.

A boost control module 240 sets a target wastegate opening 242 based on the torque request 208. The boost actuator module 164 controls opening of the wastegate 162 based on the target wastegate opening 242. For example only, the boost actuator module 164 may determine a target duty cycle (DC) to apply to the wastegate 162 based on the target wastegate opening 242 using an equation or a lookup table that relates target wastegate openings to target DCs. The boost actuator module 164 may apply a signal to the wastegate 162 based on the target DC.

The boost control module 240 may also set a target turbo configuration 243 based on the torque request 208. The target turbo configuration 243 may include, for example, a position of vanes of the turbocharger, a geometry of the turbocharger, or another suitable parameter. The boost actuator module 164 may control the turbocharger turbine and/or the turbocharger compressor based on the target turbo configuration 243.

A cylinder control module 244 may generate cylinder activation/deactivation commands 248 based on the torque request 208. The cylinder actuator module 120 deactivates the intake and exhaust valves of the cylinders based on the activation/deactivation commands 248.

The fuel control module 232 halts fueling of deactivated cylinders. The fuel control module 232 sets the target fueling parameters 236 to provide fuel to activated cylinders. Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed. The fuel control module 232 may cutoff fuel to one, more than one, or all of the cylinders of the engine, for example, during vehicle deceleration. This may decrease fuel consumption of the engine 102.

An EGR control module 252 determines a target EGR opening 256 based on the torque request 208. The EGR actuator module 172 controls opening of the EGR valve 170 based on the target EGR opening 256.

A spark control module 258 determines a target spark timing 260 based on the torque request 208. The spark actuator module 126 controls spark timing based on the target spark timing 260. The target actuator values may be determined using equations or lookup tables that relate torque requests to target actuator values.

One or more control modules may adjust one or more target actuator values under one or more circumstances, such as for regeneration of the GPF 138, as discussed further below.

Figure 3:
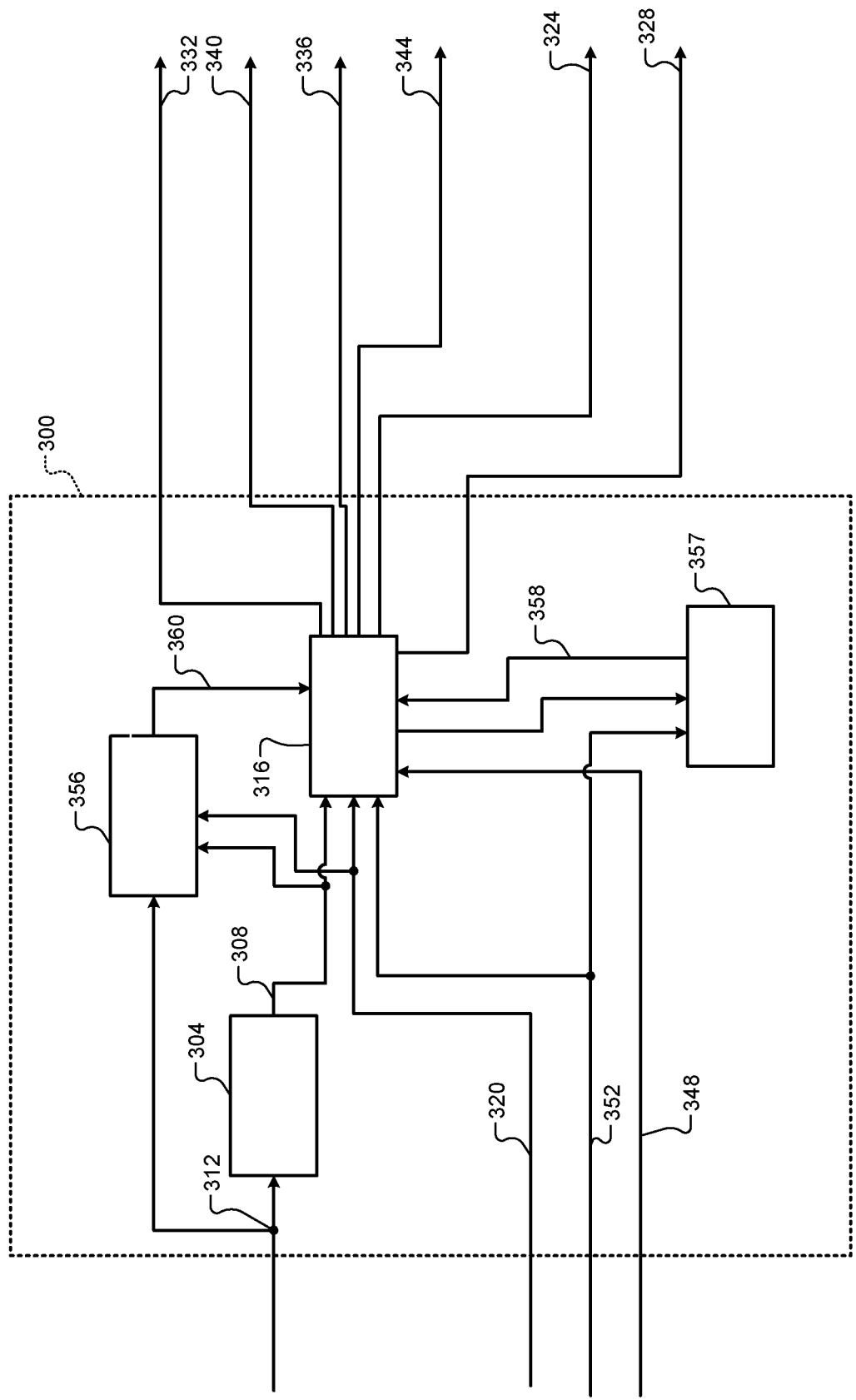
FIG. 3 is a functional block diagram of an example regeneration module.

FIG. 3 is a functional block diagram of an example implementation of a regeneration module 300. The regeneration module 300 controls regeneration of the GPF 138. The regeneration module 300 intrusively uses the flow path through the EGR valve 170 to flow fresh air to the GPF 138 for regeneration without the air first going through the engine 102.

The regeneration module 300 closes the wastegate 162 to, via the turbocharger, increase the pressure within the intake manifold 110 to greater than a pressure at the location where the EGR system is connected to exhaust system 134. The regeneration module 300 may adjust cam phasing and/or valve lift to limit airflow through the engine 102 to force air through the EGR valve 170 and to the GPF 138 for regeneration. The regeneration module 300 may control fueling to create stoichiometric or slightly fuel rich exhaust input to the catalyst 136 to limit NOx emissions and to control temperature of the GPF 138 to create particulate burning conditions.

A particulate module 304 determines a present amount of particulate trapped within the GPF 138. The particulate module 304 may determine the present amount of particulate 308, for example, based on exhaust (e.g., mass) flowrate (EFR) 312 and one or more other parameters. For example, the particulate module 304 may determine the amount of particulate 308 using one or more equations and/or lookup tables that relate EFRs and the other parameter(s) to amounts of particulate.

A regeneration control module 316 selectively performs regeneration of the GPF 138 based on the amount of particulate 308. For example, the regeneration control module 316 initiates a regeneration when the amount of particulate 308 is greater than or equal to a predetermined amount of particulate. The predetermined amount (e.g., mass) may be a fixed predetermined value that is calibrated. The regeneration control module 316 may not perform regeneration when the amount of particulate 308 is less than the predetermined amount.

When the regeneration control module 316 determines to perform regeneration, the regeneration control module 316 may determine whether a temperature 320 of exhaust input to the GPF 138 is greater than a predetermined temperature. If the temperature 320 is greater than or equal to the predetermined temperature, the regeneration control module 316 may proceed with the regeneration.

If the temperature 320 is less than the predetermined temperature, the regeneration control module 316 may generate a regeneration fuel command 324 and/or a regeneration spark command 328 to increase the temperature 320 to at least the predetermined temperature. The fuel control module 232 sets one or more of the target fueling parameters 236 according to the regeneration fuel command 324. For example only, the regeneration fuel command 324 may be to richen fueling to be fuel rich relative to stoichiometry to increase the temperature 320. Additionally or alternatively, the regeneration fuel command 324 may be to perform two or more fuel injections per combustion event to increase the temperature 320. The spark control module 258 sets the target spark timing 260 according to the regeneration spark command 328. For example only, the regeneration spark command 328 may be to retard spark timing relative to a present (e.g., target) spark timing or relative to a predetermined spark timing.

Once the temperature 320 has reached the predetermined temperature, the regeneration control module 316 may generate a regeneration wastegate (WG) command 332. The boost control module 240 sets the target wastegate opening 242 according to the regeneration wastegate command 332. For example only, the regeneration wastegate command 332 may be to close the wastegate 162 relative to a present (e.g., target) wastegate opening or to completely close the wastegate 162 by actuating the wastegate 162 to a fully closed position. This increases boost provided by the turbocharger and increases the pressure within the intake manifold 110.

The regeneration control module 316 may generate a regeneration throttle command 336 when the temperature 320 has reached the predetermined temperature. The throttle control module 216 sets the target throttle opening 220 according to the regeneration throttle command 336. For example only, the regeneration throttle command 336 may be to open the throttle valve 116 relative to a present (e.g., target) throttle opening or to completely open the throttle valve 116 by actuating the throttle valve 116 to a fully open position. This may increase the pressure within the intake manifold 110.

The regeneration control module 316 may generate a regeneration valve command 340 when the temperature 320 has reached the predetermined temperature. The phaser control module 237 sets the target intake and exhaust timings 238 and 239 according to the regeneration valve command 340. For example only, the regeneration valve command 340 may be to increase valve overlap, operate in the high lift mode, and/or perform one or more intake and/or exhaust valve actuation adjustments that decrease airflow through the engine 102. This may increase the pressure within the intake manifold 110.

After increasing pressure within the intake manifold 110 via at least one of the regeneration commands 332, 336, and 340, the regeneration control module 316 may generate a regeneration EGR command 344. The EGR control module 252 sets the target throttle opening 256 according to the regeneration EGR command 344. For example only, the regeneration EGR command 344 may be to open the EGR valve 170 relative to a present (e.g., target) throttle opening or to completely open the EGR valve 170 by actuating the EGR valve 170 to a fully open position. When the pressure is increased within the intake manifold 110, opening the EGR valve 170 may allow fresh air to flow through the EGR valve 170 to the GPF 138 for regeneration without first flowing through the engine 102. In this manner, the EGR valve 170 is controlled to allow fresh air to bypass the engine 102.

The regeneration control module 316 may verify that fresh air is flowing through the EGR valve 170 after opening the EGR valve 170. For example only, the regeneration control module 316 may determine that fresh air is flowing through the EGR valve 170 when an amount of oxygen 348 measured by the oxygen sensor 139 increases and/or when a delta pressure 352 measured by the delta pressure sensor 188 indicates that the pressure closer to the exhaust system 134 is less than the pressure closet to the intake system by at least a predetermined amount. If fresh air is not flowing, the regeneration control module 316 may update the regeneration EGR command 344 to open the EGR valve 170 more, the regeneration wastegate command 332 to close the wastegate 162 further, the throttle regeneration command 336 to open the throttle valve 112 further, and/or the regeneration valve command 340 to further increase valve overlap. Valve overlap may refer to the period during which both the intake and exhaust valves of a cylinder are open.

After verifying that fresh air is flowing through the EGR valve 170, the regeneration control module 316 may update the regeneration fuel command 324. As described above, the fuel control module 232 sets one or more of the target fueling parameters 236 according to the regeneration fuel command 324. For example only, the regeneration fuel command 324 may be set by the regeneration control module 316 to provide exhaust of a predetermined equivalence ratio to the catalyst 136. The predetermined equivalence ratio may be, for example, a stoichiometry (1.0) or a predetermined amount more fuel rich than stoichiometry (e.g., 0.97-1.0).

An amount module 357 determines a total amount of fresh air that has flowed through the EGR valve 170 since the regeneration began. For example, every predetermined period, the amount module 357 may determine a present mass air flowrate through the EGR valve 170 based on the delta pressure 352 using one of a lookup table and an equation that relates delta pressures to mass air flowrates. Each predetermined period, the amount module 357 may determine an air mass based on the present mass air flowrate, such as by determining a mathematical integral of the present mass air flowrate. The amount module 357 may add the air mass to the total amount to update the total amount each predetermined period.

The regeneration control module 316 maintains generation of the regeneration commands until regeneration is complete, such as until the total amount of fresh air that has flowed through the EGR valve 170 is greater than or equal to a threshold amount 360 of fresh air. The threshold amount 360 may be a predetermined fixed value that is calibrated. Alternatively, a threshold module 356 may determine the threshold amount 360. The threshold module 356 may determine the threshold amount 360, for example, based on the amount 308 when regeneration was performed, the temperature 320, the exhaust flow rate 312, and/or one or more other suitable parameters. The threshold module 356 may determine the threshold amount 360 using one or more equations and/or lookup tables that relate the input(s) to threshold amounts.

When the total amount is greater than or equal to the threshold amount 360, the regeneration control module 316 may determine that the regeneration is complete and stop generating the commands 324, 328, 332, 336, 340, and 344. This may allow control of the engine actuators to return to normal operation.

Figure 4:
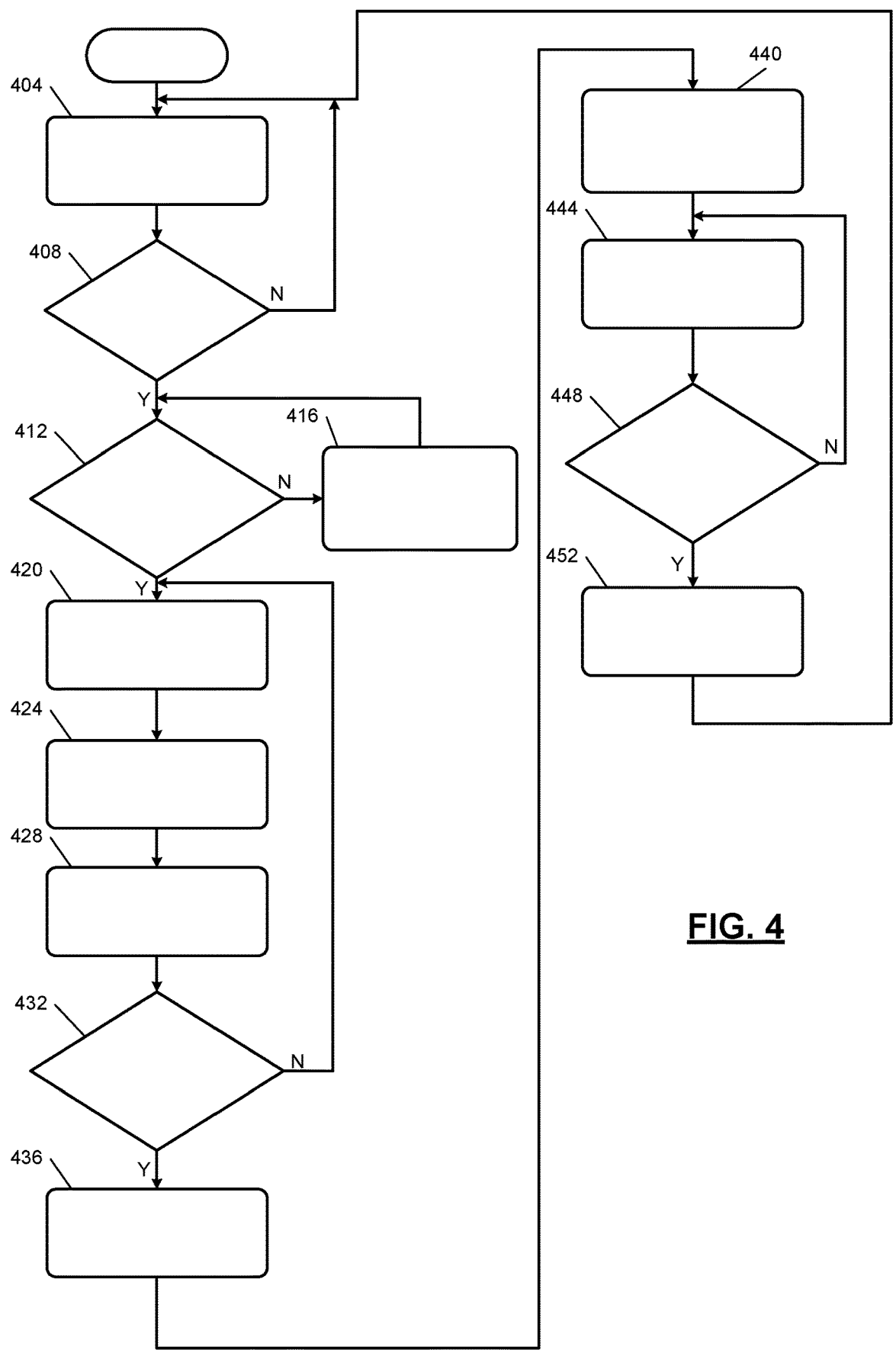
FIG. 4 is a flowchart depicting an example method of controlling regeneration of a gasoline particulate filter.

FIG. 4 is a flowchart depicting an example method of controlling regeneration of the GPF 138. Control may begin with 404 where the particulate module 304 determines the present amount 308 of particulate within the GPF 138. At 408, the regeneration control module 316 determines whether the amount 308 of particulate is greater than the predetermined amount of particulate for initiating regeneration of the GPF 138. If 408 is true, control continues with 412. If 408 is false, control returns to 404.

At 412, the regeneration control module 316 may determine whether the temperature 320 is greater than or equal to the predetermined temperature. If 412 is false, the regeneration control module 316 generates the regeneration fuel command 324 and/or the regeneration spark command 328 at 416 to increase the temperature 320 and control returns to 412. If 412 is true, control continues with 420.

At 420, the regeneration control module 316 generates the regeneration wastegate command 332 to close the wastegate 162. At 424, the regeneration control module 316 generates the regeneration valve command 340 to adjust at least one intake and/or exhaust valve operating parameter to limit airflow through the engine 102 and to increase pressure within the intake manifold 110. For example, the regeneration control module 316 may increase valve overlap and/or operate in high lift mode.

At 428, the regeneration control module 316 generates the regeneration EGR command 344 to open the EGR valve 170. Opening the EGR valve 170 under these conditions flows fresh air from the intake manifold 110 to the GPF 138 for regeneration.

At 432, the regeneration control module 316 may determine whether the fresh air is flowing through the EGR valve 170 to the GPF 138. For example, the regeneration control module 316 may determine whether the amount of oxygen input to the GPF 138 has increased or whether the pressure on the exhaust system side of the EGR valve 170 is less than the pressure on the intake system side of the EGR valve 170. If 432 is false, control may return to 420 to close the wastegate 162 further, adjust the valve timing and/or lift further, and/or open the EGR valve 170 further. If 432 is true, control continues with 436.

At 436, the regeneration control module 316 updates the regeneration fuel command 324 for burning of the particulate within the GPF 138. For example, the regeneration control module 316 may set the regeneration fuel command 324 to achieve approximately stoichiometric exhaust flow into the catalyst 136, to achieve a target GPF temperature, and/or to achieve a target particulate burn rate.

At 440, the threshold module 356 may determine the threshold amount 360 of air through the EGR valve 170 to complete the regeneration. At 444, the amount module 357 determines the total amount of air that has flows through the EGR valve 170 since regeneration began (when 408 was true). At 448, the regeneration control module 316 determines whether the total amount 358 is greater than or equal to the threshold amount 360. If 448 is true, the regeneration control module 316 stops generating the commands 332-344 and allows normal engine actuator control to resume at 452, and control returns to 404. If 448 is false, control returns to 444 to update the total amount 358.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A regeneration system for a vehicle, comprising:
   a particulate module configured to determine an amount of particulate trapped within a particulate filter, the particulate filter configured to filter particulate from exhaust output from an engine; and
   a regeneration control module configured to, in response to a determination that the amount of particulate trapped within the particulate filter is at least a predetermined amount:
   close a wastegate of a turbocharger; and
   open an EGR valve connected (a) to an intake system of the engine downstream of the turbocharger and (b) to upstream of the particulate filter,
   the closing of the wastegate and the opening of the EGR valve flowing air from (a) the intake system to (b) upstream of the particulate filter through the EGR valve without the air entering the engine.

2. The regeneration system of claim 1 wherein the regeneration control module is further configured to, in response to the determination that the amount of particulate trapped within the particulate filter is at least the predetermined amount, adjust at least one of an intake valve opening timing and an intake valve closing timing.

3. The regeneration system of claim 1 wherein the regeneration control module is further configured to, in response to the determination that the amount of particulate trapped within the particulate filter is at least the predetermined amount, adjust at least one of an exhaust valve opening timing and an exhaust valve closing timing.

4. The regeneration system of claim 1 wherein the regeneration control module is further configured to, in response to the determination that the amount of particulate trapped within the particulate filter is at least the predetermined amount, adjust an intake valve opening timing, an intake valve closing timing, an exhaust valve opening timing, and an exhaust valve closing timing.

5. The regeneration system of claim 1 wherein the regeneration control module is configured to close the wastegate before opening the EGR valve.

6. The regeneration system of claim 1 wherein the regeneration control module is further configured to:
   determine whether air is flowing from (a) the intake system to (b) upstream of the particulate filter through the EGR valve after the opening of the EGR valve; and
   in response to a determination that air is not flowing from (a) the intake system to (b) upstream of the particulate filter through the EGR valve, at least one of:
      open the EGR valve further; and
      close the wastegate further.

7. The regeneration system of claim 1 wherein the regeneration control module is further configured to:
   determine whether air is flowing from (a) the intake system to (b) upstream of the particulate filter through the EGR valve after the opening of the EGR valve; and
   adjust fueling of the engine in response to a determination that air is flowing from (a) the intake system to (b) upstream of the particulate filter through the EGR valve.

8. The regeneration system of claim 7 wherein the regeneration control module is configured to adjust fueling of the engine based on a stoichiometric exhaust input to a catalyst implemented upstream of the particulate filter.

9. The regeneration system of claim 8 wherein the EGR valve is connected to (b) between the catalyst and the particulate filter.

10. The regeneration system of claim 7 wherein the regeneration control module is configured to, based on an amount of oxygen measured in exhaust by an oxygen sensor located upstream of the particulate filter, determine whether air is flowing from (a) the intake system to (b) upstream of the particulate filter through the EGR valve.

11. The regeneration system of claim 7 wherein the regeneration control module is configured to, based on a pressure across the EGR valve measured using a delta pressure sensor, determine whether air is flowing from (a) the intake system to (b) upstream of the particulate filter through the EGR valve.

12. The regeneration system of claim 1 further comprising a threshold module configured to determine a threshold amount of air through the EGR valve for regeneration,
   wherein the regeneration control module is configured to end the regeneration when an amount of air through the EGR valve during the regeneration is greater than or equal to the threshold amount of air through the EGR valve.

13. The regeneration system of claim 12 further comprising an amount module configured to determine the amount of air through the EGR valve during the regeneration based on a pressure across the EGR valve measured using a delta pressure sensor.

14. The regeneration system of claim 1 wherein the particulate filter is a gasoline particulate filter.

15. The regeneration system of claim 1 wherein the regeneration control module is configured to close the wastegate in response to a determination that a temperature of exhaust input to the particulate filter is greater than or equal to a predetermined temperature.

16. The regeneration system of claim 15 wherein, in response to a determination that the temperature of the exhaust input to the particulate filter is less than the predetermined temperature, retard a spark timing of the engine.

17. The regeneration system of claim 15 wherein, in response to a determination that the temperature of the exhaust input to the particulate filter is less than the predetermined temperature, adjust an equivalence ratio of fueling of the engine.

18. The regeneration system of claim 15 wherein, in response to a determination that the temperature of the exhaust input to the particulate filter is less than the predetermined temperature, increase a number of fuel injections per combustion event of the engine.

19. The regeneration system of claim 15 wherein, in response to a determination that the temperature of the exhaust input to the particulate filter is less than the predetermined temperature, transition to two fuel injections per combustion event of the engine.

20. A method, comprising:
   determining an amount of particulate trapped within a particulate filter of a vehicle, the particulate filter configured to filter particulate from exhaust output from an engine; and
   in response to a determination that the amount of particulate trapped within the particulate filter is at least a predetermined amount:
      closing a wastegate of a turbocharger; and
      opening an EGR valve connected (a) to an intake system of the engine downstream of the turbocharger and (b) to upstream of the particulate filter,
      the closing of the wastegate and the opening of the EGR valve flowing air from (a) the intake system to (b) upstream of the particulate filter through the EGR valve without the air entering the engine.

* * * * *